Aug. 2, 1927.

A. E. BRONSON 1,637,332

QUICK DETACHABLE CAP

Filed Feb. 12, 1920

Inventor:
Adelbert E. Bronson
by
Thurston Kwis & Hudson.

Patented Aug. 2, 1927.

1,637,332

UNITED STATES PATENT OFFICE.

ADELBERT E. BRONSON, OF CLEVELAND, OHIO, ASSIGNOR TO THE DILL MANUFACTURING COMPANY, OF CLEVELAND, OHIO, A CORPORATION OF OHIO.

QUICK DETACHABLE CAP.

Application filed February 12, 1920. Serial No. 358,298.

The invention disclosed herein relates to a construction which is exemplified as a protecting or dust cap for valve stems of pneumatic tires and as will readily appear may be used for similar purposes and effect with stem-like structures which may be used otherwise than for valve stems.

The object of the present invention is to produce a cap for a threaded stem which may be quickly attached and quickly detached from the stem in connection with which it is used.

Figure 1:
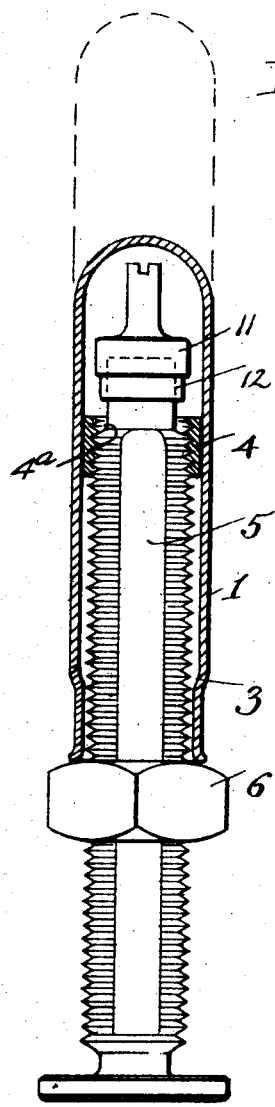
Figure 2:
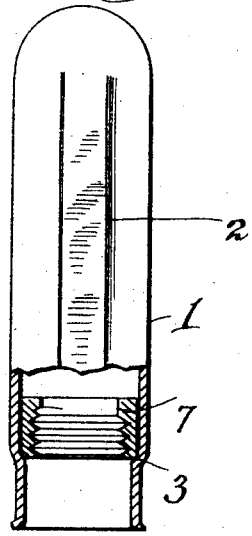
Figure 4:
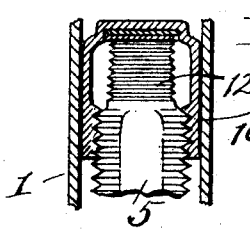
Figure 3:
Figure 5:
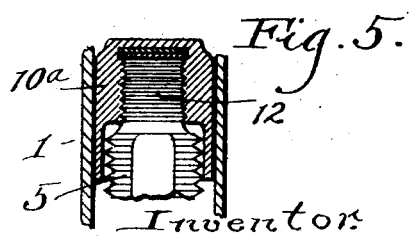
Figure 6:

Referring to the drawings Fig. 1 is a longitudinal sectional view of a cap applied to a valve stem; Fig. 2 is a sectional elevation of a cap of modified form; Fig. 3 is a sectional elevation of a nut; Fig. 4 is a partial sectional view of a modified construction; Fig. 5 is a partial sectional view of a different modification; Fig. 6 is a sectional view of a nut with tapered threads.

The body or shell of the cap is in the drawings indicated at 1. This shell may be formed in any desirable manner but preferably is drawn from sheet metal. One end of the cap is closed while the other end is open so that it may be passed over the stem with which it cooperates. Adjacent the open end of the shell the wall of the shell is somewhat reduced in diameter thereby providing a shoulder 3. This shoulder may be considered indicative of any construction accomplishing the same result.

The body of the shell is as shown in the drawing provided with a flat wall indicated at 2 while the other portions of the shell are circular. This particular configuration of the shell is provided in order that a nut or bushing may be nonrotatively mounted within the shell. It is considered within the limits of this invention to form the shell in any fashion which will adapt itself to receive a nut in a manner such that the nut will not rotate relative to the shell as for instance polygonal in cross section.

Furthermore the friction between the side wall of the nut and the wall of the shell may be utilized to prevent rotation of the nut relative to the shell, even though the shell and nut may have engaging walls which are round.

Within the shell there is a nut 4 and as before stated this nut is preferably so mounted within the shell that it will not rotate relative to the shell. Moreover the nut in the present instance conforms substantially to the inner wall of the shell and is of such dimensions that it has a tight fit within the shell so that the frictional engagement between the nut and the shell is sufficient to hold the nut against longitudinal movement within the shell except as force may be applied to effect such movements. In other words, the nut fits within the shell very snugly.

As will be readily understood, the nut is inserted within the shell before the part of the shell adjacent the outer end is reduced in diameter.

The nut 4 is provided with a central threaded opening indicated at 4ª and in the form of nut shown in Figs. 1 and 3 the threads extend completely through the opening in the nut.

In the drawings the valve stem in connection with which the exemplified cap is intended for use is represented at 5 and upon the valve stem there is a rim nut 6. The valve stem is of the usual and well known construction and the rim nut is such a nut as is customarily used in order to secure the valve stem tightly with respect to the felloe of the wheel upon which the tire carrying the valve stem is mounted.

In explaining the operation of putting the dust cap on to the valve stem, we may assume that the nut is adjacent the open end of the shell and against the shoulder 3. The cap is passed over the valve stem until the threaded opening in the nut engages with the threaded end of the valve stem. The shell is given a few turns which causes the nut to thread on to the valve stem then the shell is pushed inwardly until the inner end rests upon the rim nut. If desired a few additional turns may be given to the shell although this is not necessary.

In removing the cap the shell is given a few rotations in a direction to thread the nut off of the valve stem and in as much as there are only a few threads in engagement because of the limited turning of the shell when the cap was applied, the nut readily unscrews from the valve stem by a few turns of the shell in the direction opposite to that given when initially placing the cap.

There is of course nothing to hinder the person applying the cap from continuing to rotate the shell until the nut is moved down the length of the valve stem which is within the cap but this is not the preferable method of employing the cap as obviously this would require as much of the turning on action at its application and the turning off application at its removal as caps at present employed.

As stated before, the cap becomes attached when the nut is threaded on to the valve stem for a few turns and so the application and the removal are thus more easily and quickly accomplished than is possible with dust caps as usually constructed.

The shell is held due to the frictional engagement between the nut and the cap and this action is somewhat increased by the fact that the edge at the open end of the cap engages with the rim nut or the rim of the wheel itself if the nut be omitted thus adding additional frictional engagement which is sufficient to prevent the dust caps from becoming loose.

The nut may be provided with a tapered threaded opening, so that as the nut screws onto the valve stem it will finally bind and move no further, thus definitely positioning the nut on the valve stem.

In the form of the invention shown in Fig. 2 the dust cap is in all essential particulars the same, and the nut which is indicated at 7 has a tight fit in the shell so as to produce a high degree of frictional contact between the nut and the shell. The nut is provided with a central opening which is threaded but not all the way through so that when a threaded element is introduced into the nut, the nut may pass upon the threaded element until the threads of the threaded element come to the end of the threaded portion of the nut when further movement is retarded because of the unthreaded condition of the remaining portion of the central opening of the nut. In other words, the part of the nut above the threaded portion in effect forms a stop.

The construction which has just been described and as shown in Fig. 2 is applied to the valve stem in precisely the same manner as that which has just been described with respect to the form shown in Fig. 1. There is, however, a different effect obtained in that after the shell has been introduced over the threaded stem, the shell is turned until the nut is threaded on to the stem to the limit of its movement. This then holds the nut against further rotation. Thereupon the cap may be pushed inwardly until the rim of the open end is in contact with the rim nut or the rim of the wheel in the event that the rim nut is not used.

The cap may also be applied by passing the shell over the stem, giving the shell a couple of turns so as to start the nut upon the valve stem, then pushing the cap inwardly until the rim of the open edge engages with the rim nut and then continue the rotation of the shell until rotation is stopped due to the unthreaded portion of the nut.

The close frictional engagement between the nut and the shell serves to hold the shell against displacement and this holding action is somwhat increased by the frictional contact between the rim of the open end of the shell and the rim nut.

Both forms of the construction which has been described are preferably removed by merely turning the shell until the nut screws off of the valve stem, however, if desired, after the shell has been given a preliminary turn or two the shell may be pulled outwardly until the nut engages with the shoulder 3 within the shell and then the unscrewing action is continued until the nut is released from the stem. This operation will insure that the nut will always be adjacent the open end of the shell and so in position to be engaged by the valve stem when the cap is subsequently introduced to the valve stem after mounting thereon. The same effect is secured by providing the nut with a tapered thread as shown at $4^b$ in Fig. 6.

Furthermore, by manipulating the shell upon removal from the valve stem so that the nut is adjacent the open end of the shell, the nut in the cap is always in proper position to be used upon valve stems of any length which are not longer than the cap itself.

It will be apparent that it is preferable construction to have the central opening of the nut threaded, but it is possible to make the nut of some material which will not require the threads, for instance a lead nut or bushing.

In Fig. 4 a construction is shown in which the nut 10 within the shell is so constructed as to function in the same manner as heretofore described with respect to attaching the shell upon the valve stem, and additionally the nut is constructed so as to provide a closure member for the end of the valve stem thereby taking the place of the usual valve stem cap which is indicated at 11 in Fig. 1.

In this construction the nut fits within the shell and has a tight fit with the walls thereof the same as previously described. The nut, however, is formed as a cap nut, that is to say the nut has an extension $10^a$ which caps over the central opening through the nut.

The capped nut may be constructed in any manner which is suitable for the purpose, that is to say the capped nut may be made out of bar stock so that the cap is formed integral with the nut. This is the preferable construction although any other form of capped nut suitable for the purpose may be used.

The nut may be threaded completely through the central opening therein or it may be partly threaded as before described. Also, the open space which is within the capped portion of the nut is of a suitable diameter so that it may slip over the upper reduced threaded portion of the valve stem such as indicated at 12 in Fig. 1 or the portion of the capped part of the nut just referred to may be threaded so as to engage with the portion 12 of the valve stem.

It is also possible to construct the nut so that the only portion threaded is that portion within the capped part of the nut and to leave the lower portion of the nut with its central opening unthreaded but of sufficient diameter to loosely pass over the threads of the valve stem as shown in Fig. 5.

When a nut of the construction which has been described is applied to the valve stem it will be clear that this nut can be threaded on to the valve stem only to a limited extent so that the nut is threaded the entire distance of which it is capable of moving on the valve stem by a very few turns of the shell. Thus it will be seen that the shell may be quickly attached and detached from the valve stem.

The operation and manipulation of the shell having a capped nut inserted therein is otherwise the same as that which has been previously described.

Having described my invention, I claim—

1. A cap for valve stems and the like comprising a shell having a closed end and an open end and a member within the shell and capable of sliding movement therein and adapted to directly secure the shell to the stem.

2. A dust cap for valve stems and the like comprising a shell having a closed end and an open end, a member within the shell and capable of sliding movement therein, said member having an opening adapted to engage the stem and thereby secure the shell and the stem together.

3. A cap for use with a valve stem or the like comprising a shell having a closed end and an open end, a nut mounted in the shell and capable of sliding movement therein to directly secure the shell to the stem.

4. A cap for use with a valve stem or the like comprising a shell having a closed end and an open end, a nut mounted in the shell and capable of sliding movement therein, said nut having a threaded central opening whereby the shell is directly secured to the stem.

5. A cap for use with a valve stem or the like comprising a shell having a closed end and an open end, a nut mounted in the shell and capable of sliding movement therein, the nut having a central opening which is incompletely threaded which opening is adapted to co-operate with the valve stem thereby forming a direct connection between the shell and stem.

6. A cap for valve stems and the like comprising a shell having a closed end and an open end, a member nonrotatively mounted within the shell but capable of sliding movement therein, said member having an opening adapted to engage the stem thereby to directly secure the shell and stem together.

7. A cap for valve stems and the like comprising a shell having a closed end and an open end, a member within the shell nonrotatable with respect to the shell but capable of sliding movement therein, said member having a threaded opening adapted to engage the said stem whereby the shell through said member is directly secured to the stem by manipulating the shell.

8. A cap for valve stems and the like comprising a shell having a closed end and an open end, a member within said shell which member has a pronounced frictional engagement with the inner wall of the shell but is capable of sliding movement within the shell said member being adapted to engage a valve stem to directly secure the shell to the stem.

9. A cap for valve stems and the like, comprising a shell having a closed end and an open end, a member mounted within the shell which member has a pronounced frictional engagement with the inner wall of the shell but is capable of being moved within the shell said member having a central opening which is adapted to engage with a portion of the stem thereby to directly secure the shell and stem together.

10. A cap for valve stems and the like comprising a shell having a closed end and an open end, a member nonrotatively mounted within the shell, said member having a pronounced frictional engagement with the inner wall of the shell, said member having a central opening adapted to engage with the stem thereby to directly secure the stem and shell together.

11. A cap for valve stems and the like comprising a shell having a closed end and an open end and an integral member having an opening extending through the same within the shell, which member has a pronounced and uniform frictional engagement with the inner wall of the shell and capable of sliding movement in said shell, and adapted to directly secure the shell to the stem.

12. A cap for valve stems and the like comprising a shell having a closed and open end, a rigid integral member within the shell which member has a pronounced and uniform frictional engagement with the inner wall of the shell but is capable of sliding movement, said member having a threaded central opening extending through the same whereby the shell is directly secured to the said stem.

In testimony whereof, I hereunto affix my signature.

ADELBERT E. BRONSON.